United States Patent [19]
Buchanan, Jr. et al.

[11] Patent Number: 5,685,697
[45] Date of Patent: Nov. 11, 1997

[54] COMBINED CHECK VALVE AND PRESSURE SENSOR

[75] Inventors: Harry C. Buchanan, Jr., Spring Valley; Peter S. Zhou, Dayton, both of Ohio

[73] Assignee: ITT Automotive Electrical Systems, Inc., Auburn Hills, Mich.

[21] Appl. No.: 510,384

[22] Filed: Aug. 2, 1995

[51] Int. Cl.$^6$ .................................................... F04B 49/00
[52] U.S. Cl. .............................. 417/12; 60/410; 137/554; 417/44.2
[58] Field of Search .................... 137/554; 60/409, 60/410, 411, 412, 431; 417/12, 44.2

[56] References Cited

U.S. PATENT DOCUMENTS

| | | |
|---|---|---|
| 3,295,450 | 1/1967 | Schonwald et al. ............. 417/44.2 X |
| 3,659,567 | 5/1972 | Murray . |
| 3,837,421 | 9/1974 | Ron . |
| 3,914,994 | 10/1975 | Banner ............................ 137/554 X |
| 3,918,843 | 11/1975 | Douglas et al. ................... 417/12 |
| 4,005,636 | 2/1977 | Dunn . |
| 4,010,383 | 3/1977 | Grassman . |
| 4,043,419 | 8/1977 | Larson et al. . |
| 4,075,501 | 2/1978 | Kondo . |
| 4,075,840 | 2/1978 | Jesswein . |
| 4,091,317 | 5/1978 | Roszyk et al. . |
| 4,118,148 | 10/1978 | Allen ........................... 417/44.2 X |
| 4,130,990 | 12/1978 | Amedei et al. . |
| 4,179,888 | 12/1979 | Goscenski, Jr. . |
| 4,183,467 | 1/1980 | Sheraton et al. .................. 137/554 X |
| 4,189,919 | 2/1980 | Goscenski, Jr. . |
| 4,207,031 | 6/1980 | Maskrey et al. .................. 417/12 |
| 4,224,791 | 9/1980 | Ostwald ........................ 60/411 X |
| 4,262,580 | 4/1981 | Goff et al. . |
| 4,276,903 | 7/1981 | Spohr .......................... 137/554 |
| 4,314,186 | 2/1982 | Gille et al. . |
| 4,320,329 | 3/1982 | Gille et al. . |
| 4,343,151 | 8/1982 | Lorimor . |
| 4,355,270 | 10/1982 | Cook et al. . |
| 4,401,412 | 8/1983 | Salina et al. .................... 417/12 |
| 4,410,058 | 10/1983 | Dymond . |
| 4,414,809 | 11/1983 | Burris . |
| 4,420,934 | 12/1983 | Udono . |
| 4,446,697 | 5/1984 | Goscenski, Jr. . |
| 4,463,577 | 8/1984 | Miller et al. . |
| 4,509,551 | 4/1985 | Luper . |
| 4,527,106 | 7/1985 | Fischer . |
| 4,559,777 | 12/1985 | Leiber . |
| 4,567,412 | 1/1986 | Graham . |
| 4,588,935 | 5/1986 | Kaneiwa et al. . |
| 4,611,154 | 9/1986 | Lambropolos et al. . |
| 4,639,831 | 1/1987 | Iyoda . |
| 4,663,575 | 5/1987 | Juzswik et al. . |
| 4,663,936 | 5/1987 | Morgan . |
| 4,689,535 | 8/1987 | Tsunoda et al. . |
| 4,705,998 | 11/1987 | Millerd et al. . |
| 4,710,878 | 12/1987 | Iyoda . |
| 4,723,412 | 2/1988 | Buschmann ..................... 60/431 X |
| 4,738,330 | 4/1988 | Suzuki et al. . |
| 4,797,605 | 1/1989 | Palanisamy . |
| 4,805,070 | 2/1989 | Koontz et al. . |
| 4,831,493 | 5/1989 | Wilson et al. . |
| 4,874,012 | 10/1989 | Velie ........................... 137/554 X |
| 4,922,854 | 5/1990 | Stolte . |
| 4,961,033 | 10/1990 | Hirota . |
| 4,966,066 | 10/1990 | Kauss et al. . |
| 5,030,899 | 7/1991 | Nishibe et al. . |
| 5,040,411 | 8/1991 | Medzius . |

(List continued on next page.)

FOREIGN PATENT DOCUMENTS 4444013  6/1995  Germany .

*Primary Examiner*—F. Daniel Lopez
*Attorney, Agent, or Firm*—Thomas N. Twomey; J. Gordon Lewis

[57] ABSTRACT

A check valve, for use in a vacuum accumulator. The check valve includes a movable gate, which blocks fluid flow. The gate carries a first electrical contact, which mates with a second electrical contact, when the gate closes, thereby issuing a signal which indicates closure. The invention eliminates the need for a separate pressure sensor, for sensing pressure within the accumulator.

4 Claims, 9 Drawing Sheets

U.S. PATENT DOCUMENTS

| | | |
|---|---|---|
| 5,086,260 | 2/1992 | Ito . |
| 5,086,273 | 2/1992 | Leon . |
| 5,140,234 | 8/1992 | Wallrafen . |
| 5,157,314 | 10/1992 | Kühbauch . |
| 5,235,260 | 8/1993 | Furukoshi . |
| 5,285,138 | 2/1994 | Okada . |
| 5,304,936 | 4/1994 | Buschur . |
| 5,404,085 | 4/1995 | Resch et al. . |
| 5,412,296 | 5/1995 | Chien et al. . |
| 5,515,676 | 5/1996 | Earle ................................. 417/12 X |

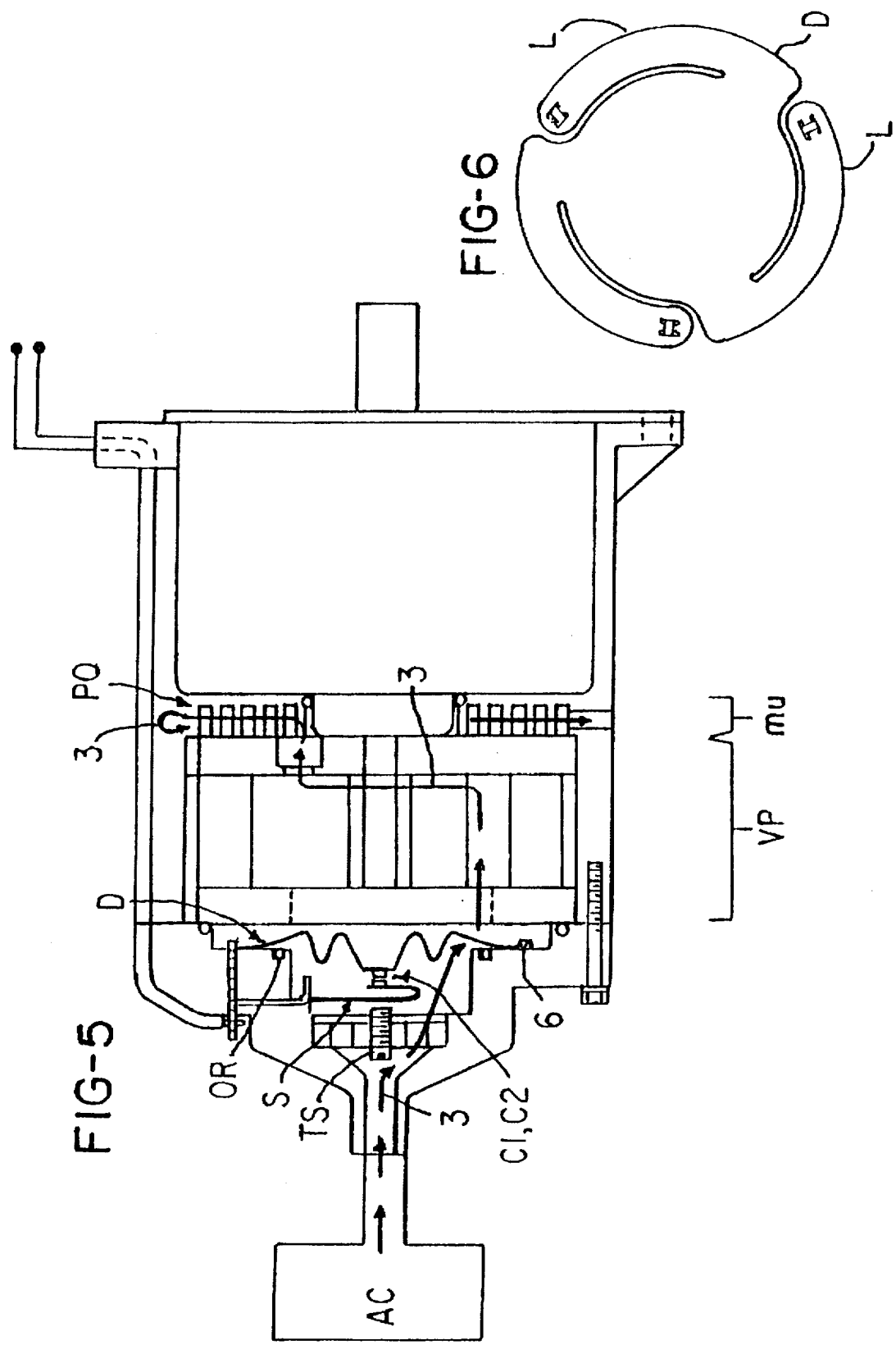

COMBINED CHECK VALVE AND PRESSURE SENSOR

The invention concerns a check valve for use in a vacuum accumulator, such as in a power braking system in a motor vehicle. The check valve contains an integral sensor which senses state of the valve (i.e., open or closed).

BACKGROUND OF THE INVENTION

Internal combustion engines which run on the Otto cycle generate a low pressure, commonly called vacuum, in the intake manifolds. This vacuum is often used as an energy source, as for operating power brakes, and valves in the cabin heating and cooling system.

However, engines which run on the Diesel cycle do not, in general, produce a sufficient vacuum for these purposes. In these engines, an auxiliary vacuum pump is used. FIG. 1 is a simplified schematic of a vacuum system used in such a vehicle.

The vacuum pump P draws vacuum on an accumulator AC, through a check valve CV. A sensor SN measures the pressure within the accumulator. When the pressure falls below a threshold, the sensor issues a signal to a control system CS, which orders the pump to terminate operation, because sufficient vacuum exists within the accumulator. After termination, the check valve closes.

When the pressure rises sufficiently, due to leakage and draw-down by usage of energy stored in the accumulator, the sensor detects the rise..and the control system orders the pump to resume operation.

The inventors have developed an apparatus which consolidates the sensor and the check valve into a single device.

OBJECTS OF THE INVENTION

An object of the invention is to provide an improved check valve for a vacuum system.

A further object of the invention is to provide a vacuum sensor which is integrated into a check valve.

SUMMARY OF THE INVENTION

In one form of the invention, a proximity sensor is associated with a gate in a check valve. The proximity sensor issues a signal when the gate reaches a predetermined position.

BRIEF DESCRIPTION OF THE DRAWINGS

FIG. 5 illustrates a more detailed embodiment of the invention.

FIG. 6 illustrates one form of the diaphragm D shown in FIG. 5.

Figure 1:
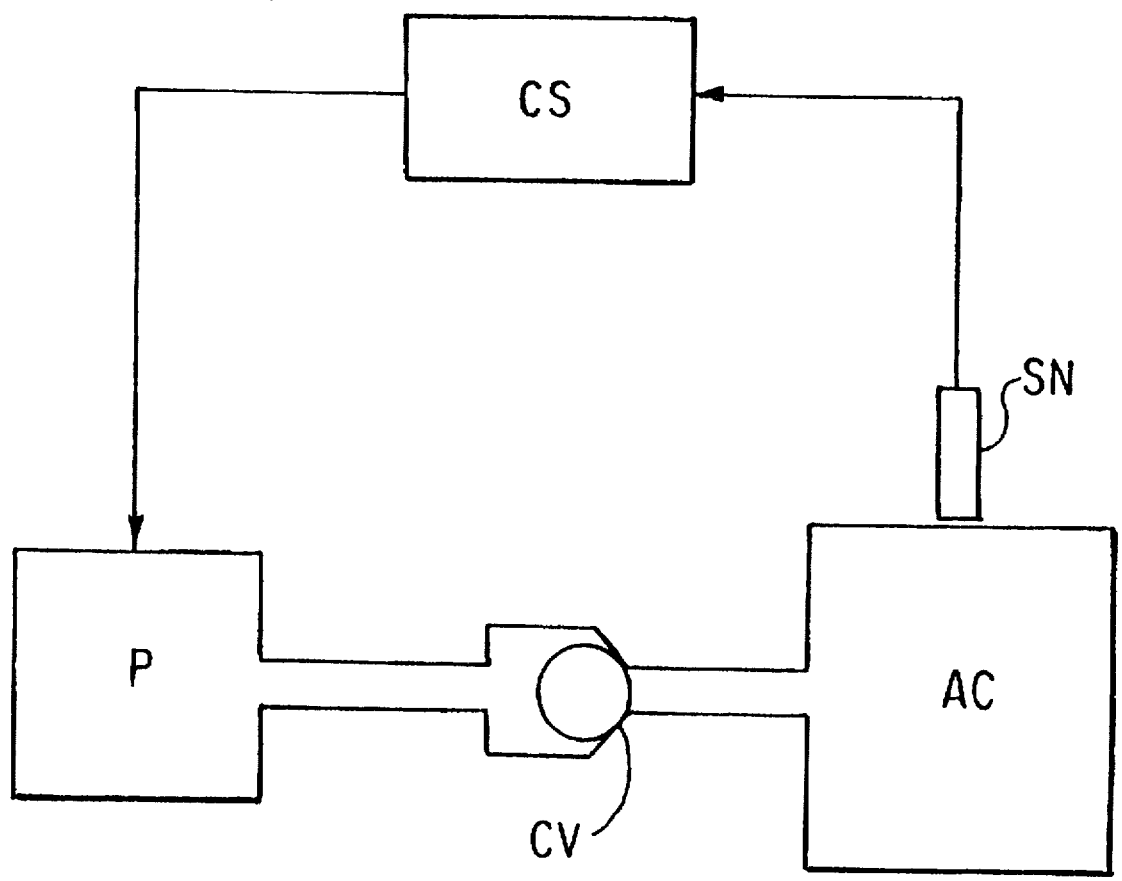
FIG. 1 illustrates a prior-art vacuum system.
Figure 2A:
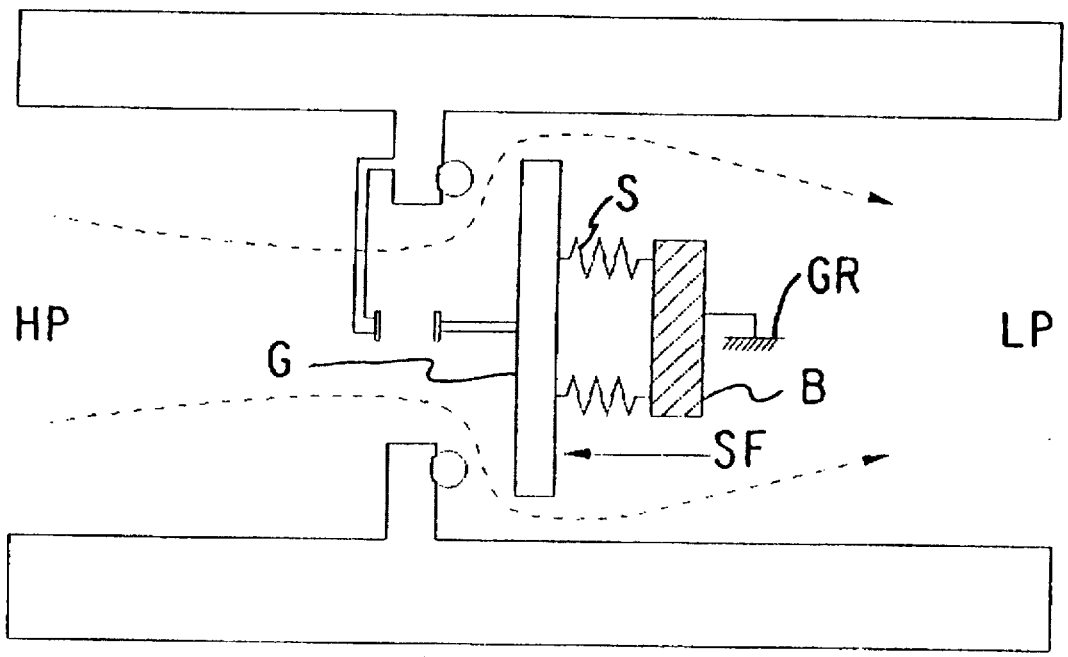
FIGS. 2, 3, and 4 illustrate various embodiments of the invention.

DETAILED DESCRIPTION OF THE INVENTION Simplified View of Invention FIG. 2

FIGS. 2 and 3 provide simplified views of principles used by the invention. In FIG. 2, springs S are supported by a body B, which is fixed in position, as indicated by the ground symbol GR. The springs, in turn, support a gate G.

The gate is in an open position, because of high pressure air, HP, on the left side of the Figure, compared with the low pressure air, LP, on the right side. The high pressure air applies a force which overcomes the spring force, which is indicated by arrow SF.

Under these conditions, air flows past the gate, as indicated by the dashed arrows.

Figure 2B:
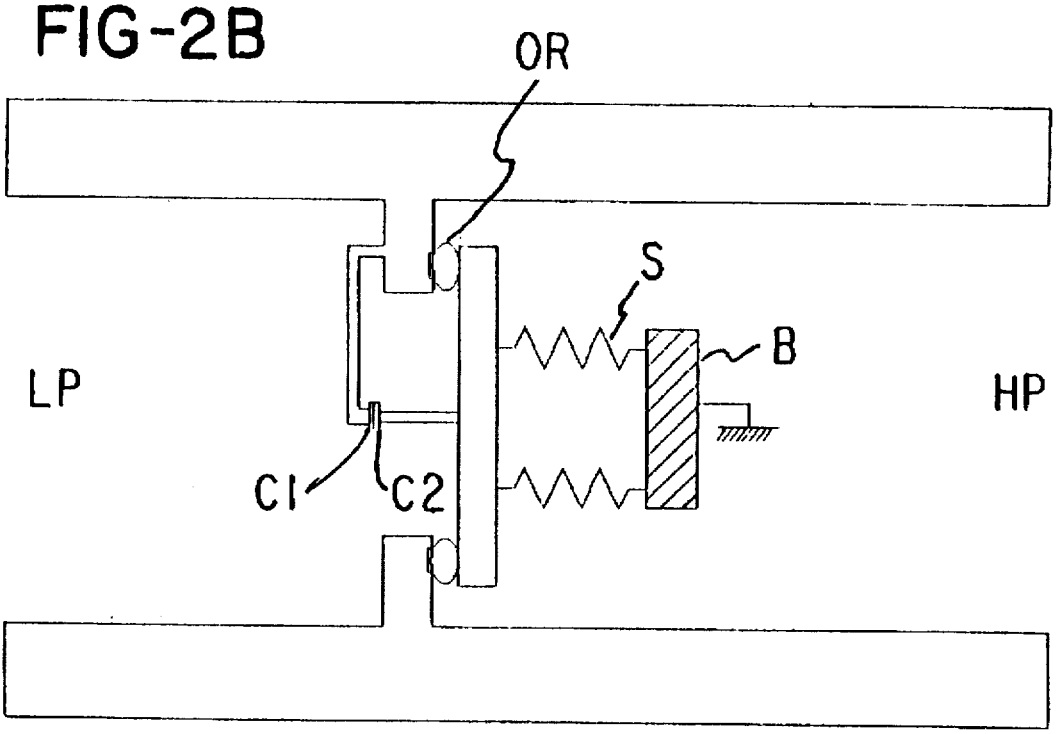

When the air pressure on the left falls below that on the right by a sufficient amount, as indicated by low pressure, LP, on the left of FIG. 2B, and high pressure, HP, on the right, the force of springs S is no longer overcome. The combined force of the springs S and the high pressure air HP close the gate G, as indicated. The gate now engages an O-ring, OR, and seals off airflow. In addition, electrical contacts C1 and C2 make connection, allowing instrumentation (not shown) to detect closure of the gate.

FIG. 3

Figure 3A:
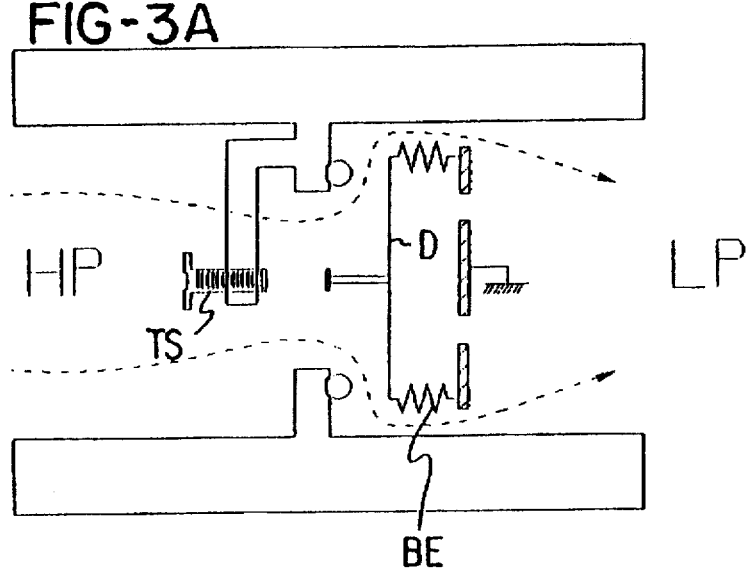

FIG. 3 illustrates another simplified form of the invention. The gate takes the form of a diaphragm D which is supported by bellows BE. In FIG. 3A, the high pressure HP exceeds the combination of the low pressure LP and the spring force of the bellows, thereby allowing airflow, as indicated by the dashed arrows.

Figure 3B:
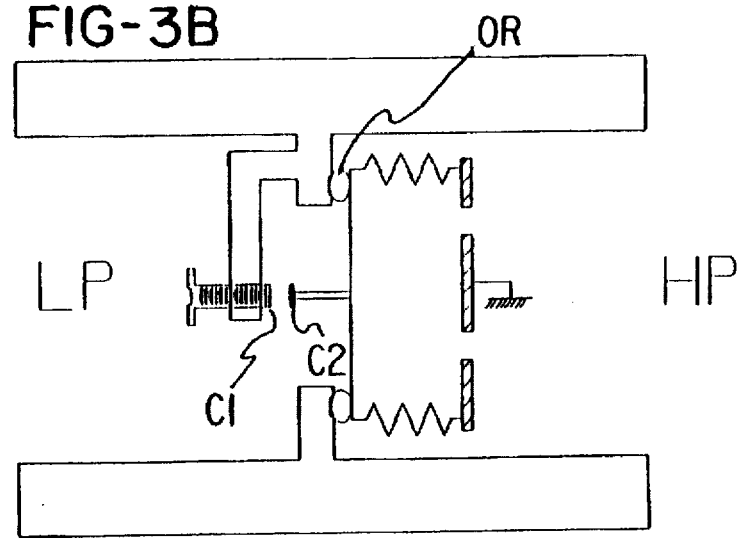

When the high pressure HP falls, and becomes the low pressure LP indicated in FIG. 3B, the drop allows the diaphragm to mate with the O-ring OR, the diaphragm D blocks airflow. However, the contacts C1 and C2 do not connect at this time, because stationary contact C1 is mounted on a threaded stud TS. The threaded stud has been withdrawn to the left.

Figure 3C:
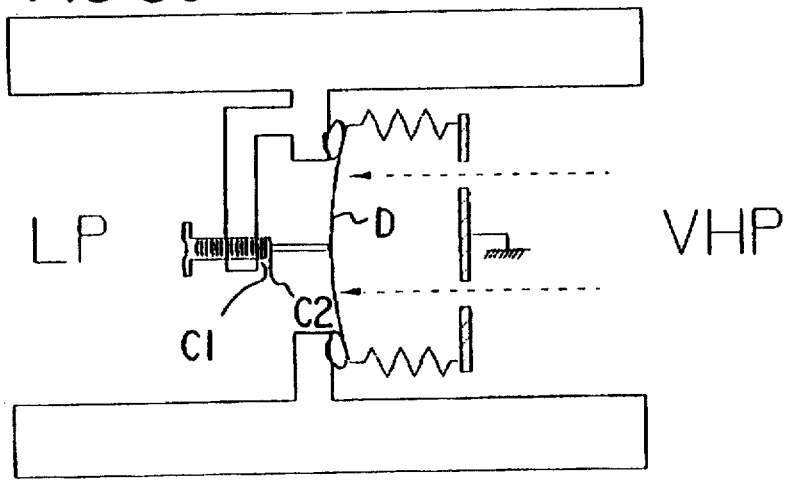

As the pressure on the left falls further, the situation becomes as shown in FIG. 3C. Low pressure, LP, exists on the left, and very high pressure, VHP, exists on the right. The larger pressure differential, compared with that of FIG. 3B, causes the diaphragm D to become bowed, as indicated. Now the contacts C1 and C2 connect.

In the sequence shown in FIG. 3, the diaphragm first seals off airflow (FIG. 3B), and then the contacts C1 and C2 connect (FIG. 3C). However, the reverse sequence can be achieved, which is shown in FIG. 4.

FIG. 4

Figure 4A:
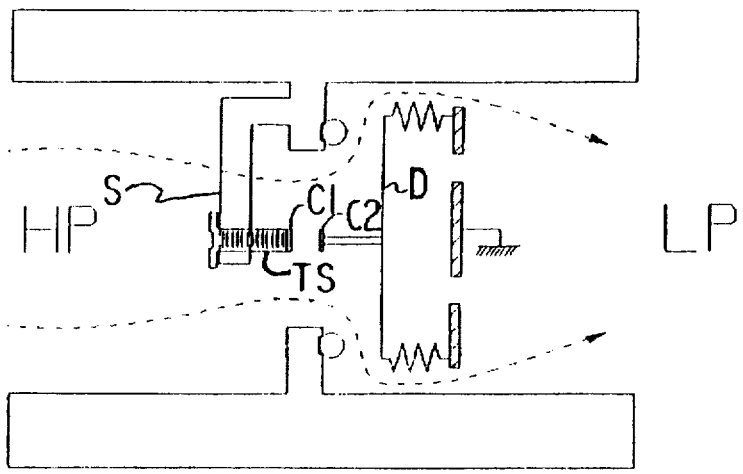
Figure 4B:
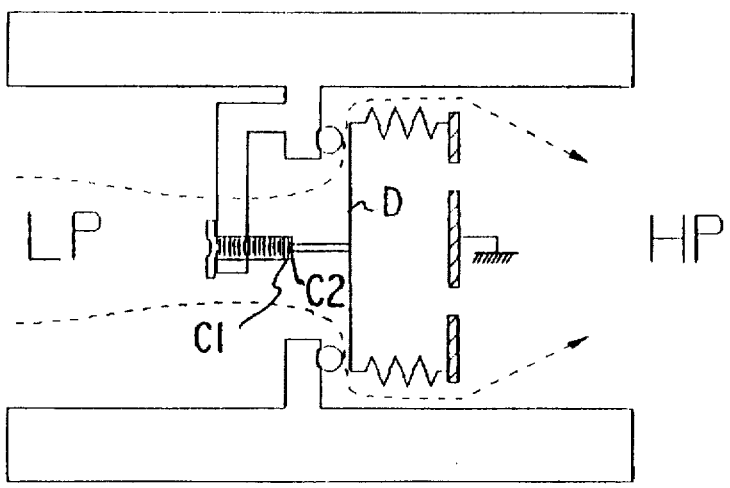
Figure 4C:
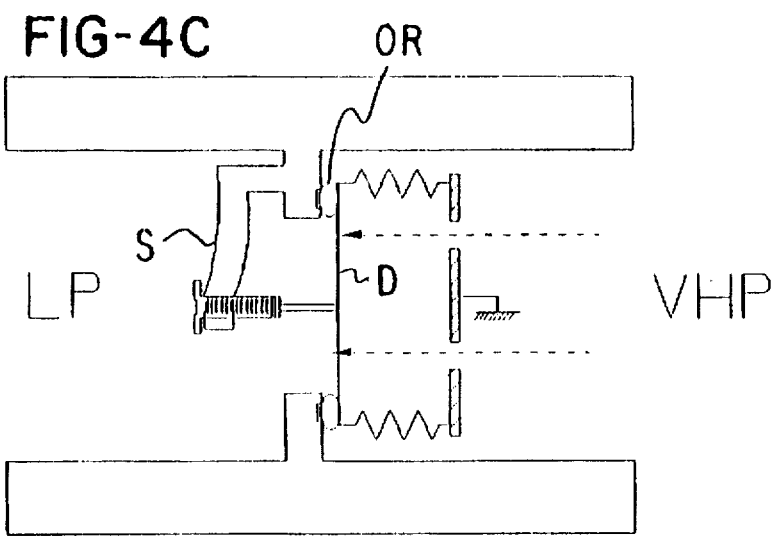

In FIG. 4A, the threaded stud TS is first advanced to the right. Further, the threaded stud is supported by a support S which is resilient. As pressure on the left drops from HP in FIG. 4A to LP in FIG. 44B, the diaphragm D moves to the left, as in FIG. 4B, and the contacts C1 and C2 connect. Then, further pressure drop causes the diaphragm to move further leftward. This motion bends the resilient support, as indicated in FIG. 4C. Yet further motion of the diaphragm makes contact with the O-ring OR, thereby blocking airflow.

In the sequence of FIG. 4, the contacts C1 and C2 first meet, and then the diaphragm mates with the O-ring OR, to block airflow.

MORE DETAILED FORM OF THE INVENTION

Numerous approaches exist to implementing the invention discussed above. FIG. 5 illustrates one approach. A vacuum pump VP draws a vacuum on an accumulator AC, as indicated by arrows 3. The air exhausts through ports PO in a muffler MU, as indicated.

Diaphragm D cooperates with O-ring OR to block the airflow 3, when in contact with the O-ring. The diaphragm is corrugated in cross section, as shown. FIG. 6 illustrates a top view of the diaphragm (corrugations are not shown).

Figure 7:
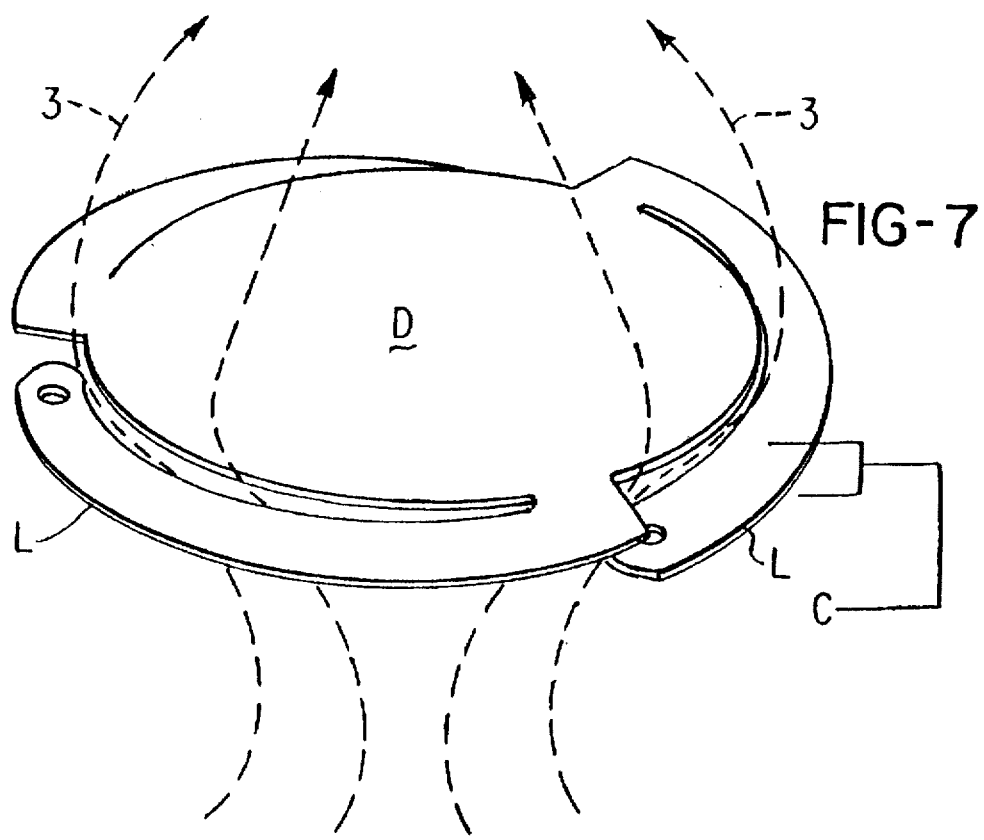
FIG. 7 illustrates flow channels C defined between the legs L and the diaphragm D, which allow fluid to flow.

FIG. 7 illustrates the diaphragm in the open position. The dashed arrows 3 indicate airflow. The diaphragm is supported by legs L, which act as leaf springs. The legs L, together with the body of the diaphragm D, define channel C through which the airflow passes.

When in the closed position (not shown), the diaphragm contacts the O-ring of FIG. 5 along the phantom line PL shown in FIG. 7.

In FIG. 5, contacts C1 and C2 are shown as open. When the diaphragm moves sufficiently leftward, the contacts close. Contact C1 is supported by a flexible support S, which can take the form of a leaf spring. Threaded stud TS adjusts the position of contact C1.

Figure 8:
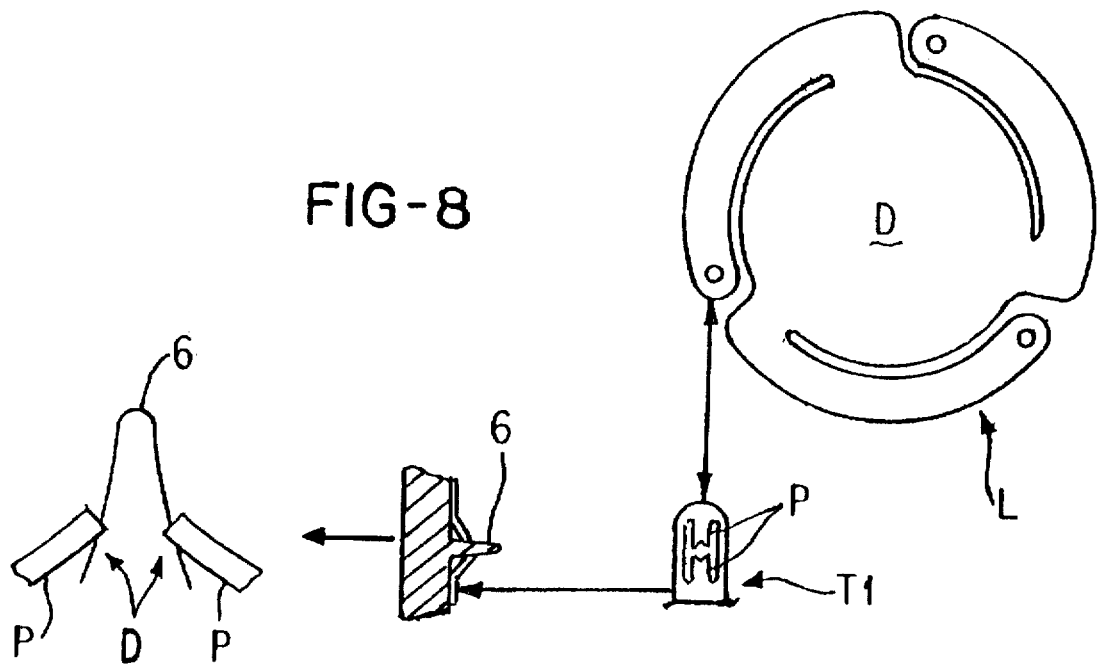
FIG. 8 illustrates Tinnermann nuts formed into the legs L.

FIG. 8 illustrates one possible configuration of legs L. A Tinnermann nut TI is integrally formed into each leg, and mates with a boss 3, also indicated in FIG. 5. A Tinnermann nut acts somewhat like a ratchet. Each pawl P makes a slight indentation D (shown in exaggerated form) in the boss 6, to secure the pawls to the boss.

ADDITIONAL CONSIDERATIONS

1. The form of the invention shown in FIG. 2 (and those shown in FIGS. 3 and 4, if the threaded stud TS is properly adjusted) produces a signal which indicates when the diaphragm-check valve closes. The spring constants involved (e.g., springs S in FIG. 2 or bellows B in FIG. 3) are designed so that a known pressure differential causes the closure of the diaphragm.

Thus, under the invention, the check valve is designed to close when a predetermined pressure differential across the diaphragm is attained, and contacts C1 and C2 produce a signal indicating closure. A control system (not shown) detects the signal, and issues the appropriate signal to a vacuum pump.

2. Manufacturing irregularities may cause different diaphragms to close at different pressure differentials. (Pressures LP and HP in FIG. 2 illustrate the differential.) Also, even if a given diaphragm closes at the proper pressure differential, usage of the diaphragm can cause various spring constants to change, causing closure to occur at different pressure differentials.

Figure 9:
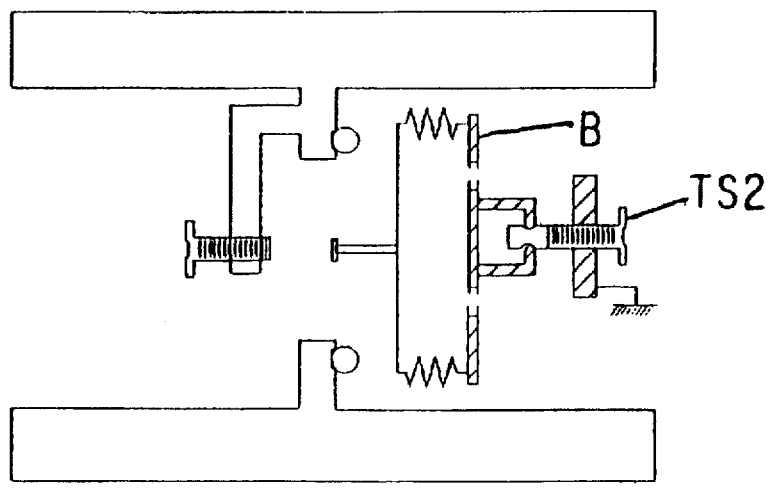
FIG. 9 illustrates modifications to the embodiments of FIG. 3, wherein stationary body B is adjustable, to adjust the spring constant of the diaphragm.

To accommodate these factors, the spring constant of the diaphragm, indicated by springs S and bellows B in FIGS. 2 and 3, can be changed. One approach is shown in FIG. 9. The support body B is made movable, by a second threaded stud TS2.

Movement of the support body changes the preloading of the springs involved.

3. The contacts C1 and C2 produce a signal when they connect: wires connecting them become shorted together. The contacts produce another signal when they become disconnected: they become open circuited.

Figure 10:
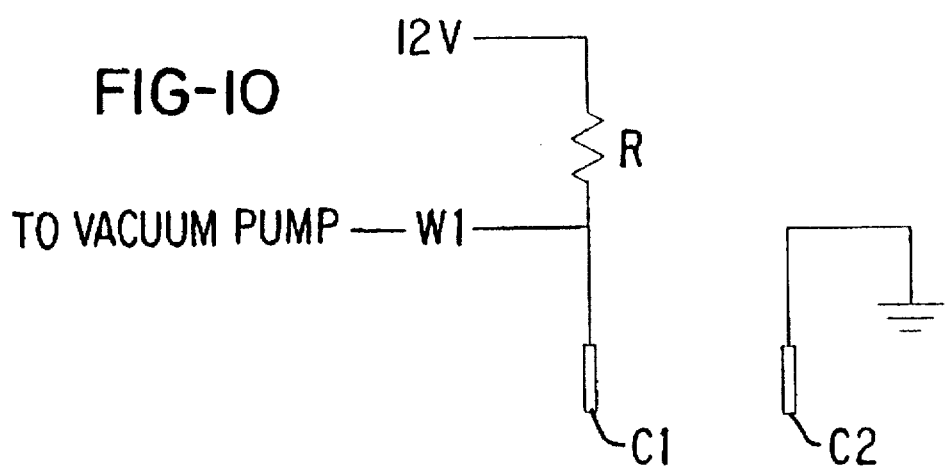
FIG. 10 illustrates one approach to generating a signal, using contacts C1 and C2.

Another approach to producing signals is in FIG. 10. When the contacts are open, resistor R produces a high voltage on wire W1. When the contacts close, wire W1 becomes shorted to ground, producing a low (or zero) voltage.

4. As discussed above, the threaded stud TS in FIG. 3 can move contact C1 both left- and rightward. When C1 is generally on the left, the diaphragm D first closes, and then the contacts meet. The meeting occurs when pressure increases on the right side of FIG. 3 to bow the diaphragm sufficiently. Thus, in FIG. 3, closure of the contact can indicate when a given pressure has been attained. A similar indication can occur in the apparatus of FIG. 4.

In FIG. 4, the contacts first meet, and then the diaphragm closes, when pressure becomes sufficient. There is a region wherein C1 can be located, such that closure of C1 with C2 can indicate the value of pressure on the right side of the diaphragm.

When C1 is within this region, the diaphragm is almost closed when the contacts close, and imposes a restriction in the airflow indicated by the dashed arrows in FIG. 4. This restriction causes an increase in pressure on the right of the Figure.

Calibration of the system will show the pressure existing on the right side of Figure, at closure of the contacts, for various positions of C1. Thus, after calibration, closure of the contacts indicates that accumulator pressure has reached the calibrated pressure.

It should be noted that the pressure indicated in the case of FIG. 3 will be a static pressure. But in FIG. 4, there is airflow through the diaphragm at the time of contact closure, so that the pressure indicated will be a combination of static and dynamic pressures. Either, or both, can be taken as indicators.

5. The closing of the contacts need not be used to indicate attainment of a predetermined pressure. Instead, contact closure can indicate attainment of a predetermined position by the diaphragm.

Figure 13:
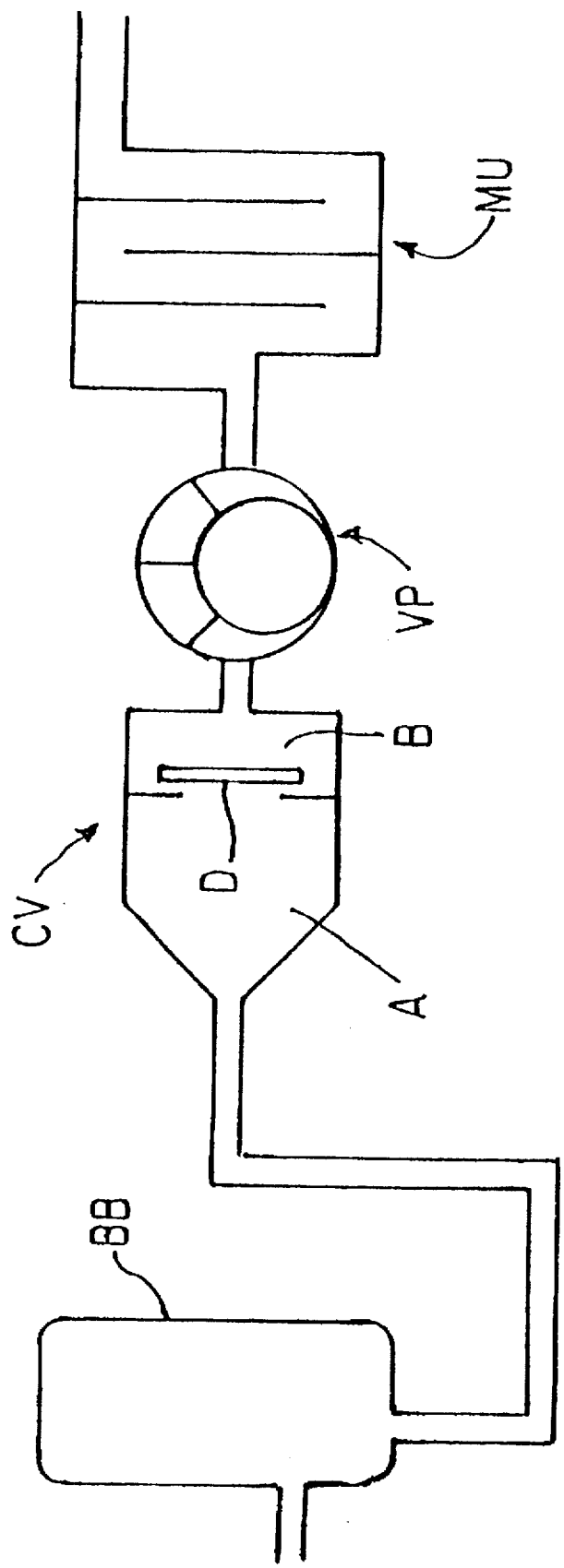
FIG. 13 illustrates a block diagram of one form of the invention.
Figure 13B:
FIG. 13B illustrates diaphragm D in an open position.
Figure 13A:
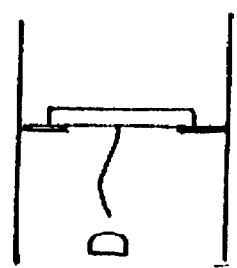
FIG. 13A illustrates diaphragm D in a closed position.

6. A control system used by the invention will be explained, with reference to FIG. 13. In that Figure, vacuum is drawn in a brake booster BB by a vacuum pump VP, through a check valve CV. In FIG. 13A, diaphragm D in its closed position. In FIG. 13B, it is open.

The invention is configured such that, in FIG. 13A, the diaphragm switch (not shown, but of the type shown in FIGS. 2–4) is closed. Conversely, in FIG. 13B, when the diaphragm D is open, the diaphragm switch is open. Therefore, as a general proposition, in this embodiment, an open diaphragm switch indicates that insufficient vacuum exists in the brake booster BB.

However, while the vacuum pump VP is running, and irrespective of the pressure within the brake booster BB, the diaphragm D is held in the open position, as shown in FIG. 13B. Thus, the vacuum pump would tend to run indefinitely, because the diaphragm switch will never change state.

Figure 12:
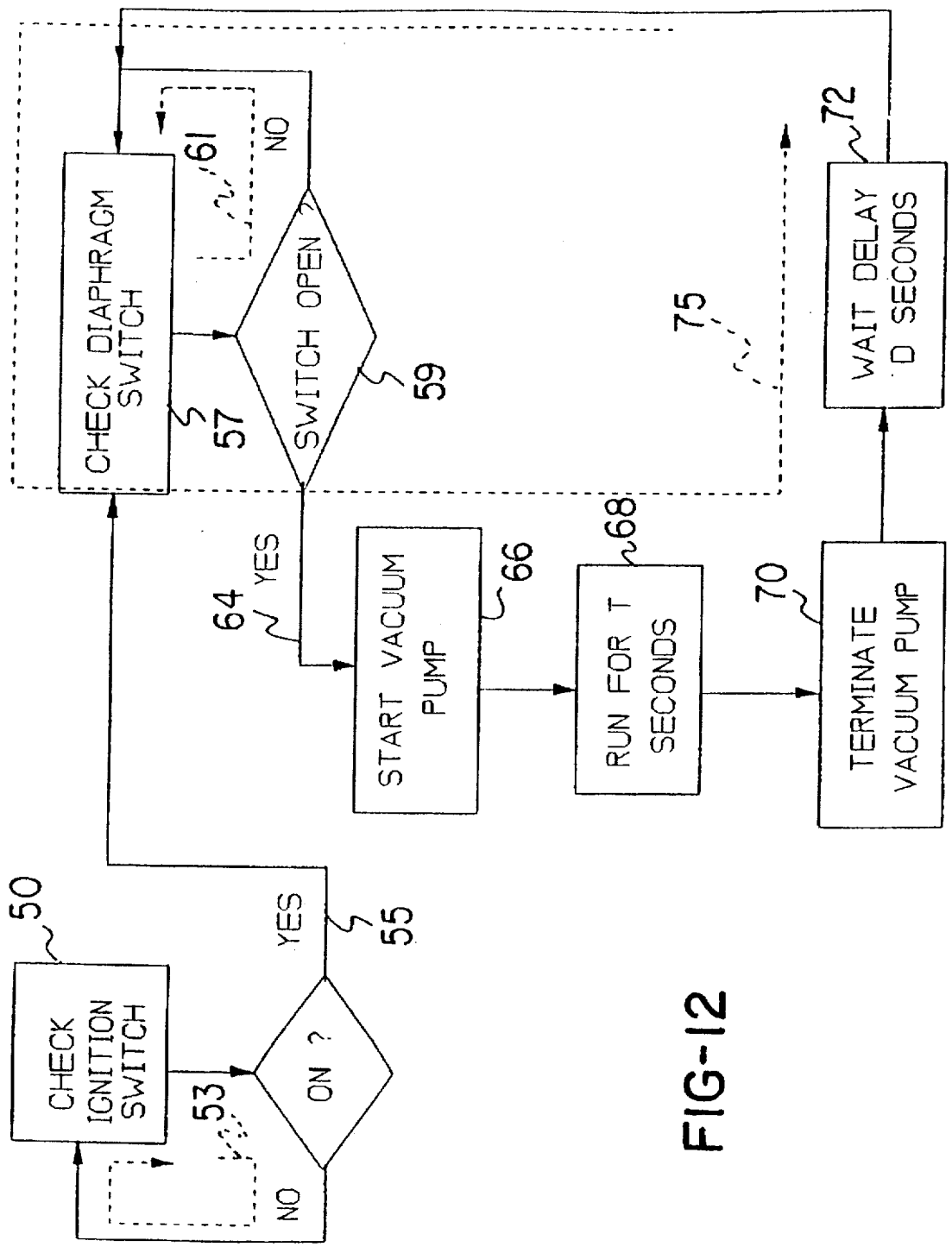
FIG. 12 illustrates logic implemented by the invention.

In order to prevent this situation, the logic of FIG. 12 is implemented, preferably in the on-board computer of the vehicle. Initially, the logic checks the ignition switch, in block 50. If the switch is off, indicating that the vehicle is not running, the logic idles in loop 53. If the switch is on, the logic takes branch 55.

In blocks 57 and 59, the logic inquires whether the diaphragm switch is open. (The diaphragm switch is indicated by contacts C1 and C2 in FIGS. 2–5.) If not, indicating that sufficient vacuum is held in the brake booster BB in FIG. 13, the logic idles in loop 61.

If the diaphragm switch is open, the logic takes branch 64. Block 66 starts the vacuum pump. Block 68 causes the pump to run for T seconds. The variable T is significant because, at different altitudes, different amounts of air must be exhausted from the brake booster BB to reach a given absolute vacuum. For example, at high altitudes, a lesser mass of air must be withdrawn. At lower altitudes, a greater mass must be withdrawn.

The variable T is set to accommodate the worst-case situation, namely, at the lowest altitude expected. Therefore, block 68 causes the pump to run long enough to exhaust the brake booster sufficiently, at the lowest altitude expected.

As stated above, the pump will now tend to continue running. Blocks 70 and 72 prevent this. Block 70 stops the pump. This stoppage allows air to leak into chamber B in FIG. 13, causing the pressure in chamber B to eventually exceed that in chamber A, thereby closing the diaphragm D. The closed situation is shown in FIG. 13A, and the diaphragm switch (not shown) now closes.

After a delay D in block 72, which is long enough to allow leakage to close the diaphragm, block 57 examines the diaphragm switch. If it is closed, indicating that sufficient vacuum exists in the brake booster BB, the logic idles in loop 61.

If the diaphragm switch is open, indicating that insufficient vacuum exists, branch 64 is taken.

If, for some reason, such as malfunction, the diaphragm switch does not close, the logic continually runs in loop 75, wherein the pump continually cycles for time T, and then waits for delay D.

The combination of time T and delay D, which define the duty cycle of the pump, should be arranged so that sufficient vacuum exists in the presence of selected malfunctions which tend to lose vacuum. For example, the duty cycle will probably be arranged to maintain vacuum in the presence of a pinhole in the check valve CV in FIG. 13. However, the duty cycle will probably not be designed to maintain vacuum if a giant hole penetrates the brake booster BB.

7. Some of the events discussed above can be explained with reference to TABLE 1, below.

TABLE 1

| Event | Booster Pressure | Chamber A Press. | Chamber B Press. | SW | Pump Flow | Muffler Flow |
| --- | --- | --- | --- | --- | --- | --- |
| No Brakes | Low | Low | HI | CL | No | No |
| Brakes | HI | Low | HI | CL | No | No |
| After Brakes | HI | HI | HI | OP | RT | RT |
| After T | Low | Low | Low | OP | No | No |
| During D | Low | Low | HI | CL* | LF | LF |
| After D | Low | Low | HI | CL | No | No |

*approaching

The first line refers to driving without application of brakes. "Booster Pressure" (BB, FIG. 13) is Low (i.e., vacuum is maintained), as indicated. "Chamber A Pressure" is also Low, because connected to booster BB. "Chamber B pressure" is HI, because the pump is off, and the diaphragm D is closed. The diaphragm switch "SW" is closed. There is no "Pump Flow," as indicated by the entry "No." There is no "Muffler Flow," again, indicated by "No."

The second line refers to ordinary application of brakes. Booster Pressure now goes HI, because atmospheric pressure is used to power assist the brakes. Booster porting maintains Chamber A at its original pressure until the brake is released, at which time the atmospheric side of the booster is ported to Chamber A, thereby requiring the pump to remove the air from the rear or high pressure side of the booster. However, Chamber A pressure stays LO, Chamber B Pressure stays HI, keeping the diaphragm D closed. There is no flow through the Pump or Muffler.

A valve, not shown, is interconnected between Chamber A and the booster. When a driver applies brake, this valve maintains Chamber A separate from the booster, thereby explaining why the second line states that Chamber A Pressure is different from Booster Pressure. However, when the driver releases the brakes, this valve connects Chamber A with the booster, thereby allowing Chamber A Pressure to equalize with Booster Pressure, consistent with the third line, explained immediately below.

The third line refers to the time interval after release of brakes. Booster Pressure remains HI, because nothing has replenished the booster. Chamber A Pressure is HI, because connected to Booster BB. The diaphragm D opens, causing switch SW to open. The logic of FIG. 14 starts the pump, causing Pump Flow and Muffler Flow in Table 1 to move to the right, RT.

The fourth line refers to the time interval IMMEDIATELY after time T. Immediately after T, Booster Pressure is Low, as are both Chamber A and B Pressures. The diaphragm D is open, keeping the switch SW in an open state, OP. There is no flow in the Pump or Muffler.

The fifth line refers to the time delay D. Booster Pressure is Low, as is Chamber A Pressure. Chamber B Pressure is HI, because diaphragm D is closed, causing the switch SW to be closed, CL. Flow through the Pump and Muffler is now to the left, LF, because of leakage.

The last line refers to the time interval after the time delay D. The three pressures are the same as in the fifth line. The diaphragm D closes the switch SW. Airflow through the Pump and the Muffler have terminated.

8. The logic described above is based on the concept that an open diaphragm switch corresponds to an open diaphragm, and appropriate steps are taken. However, the switch can be arranged, so that an open diaphragm corresponds to a closed switch. Modification of the logic shown in FIG. 12, to accommodate such an arrangement, is considered straightforward.

9. FIG. 5 shows a "J" shaped support for contact C1. This support can be constructed of a bimetallic material which moves C1 left- or rightward, as temperature changes. This bending can offset opposite changes in the position of C2, also caused by temperature changes, but by expanding and contracting the components which support C2. Thus, the bi-metallic support introduces added temperature stability.

Figure 11:
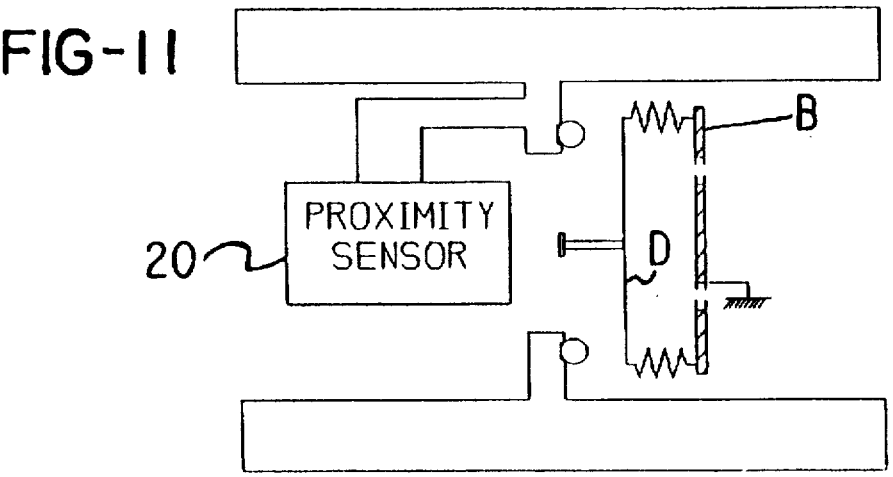
FIG. 11 illustrates a generic PROXIMITY SENSOR 20, used to detect position of the diaphragm D.

Numerous substitutions and modifications can be undertaken without departing from the true spirit and scope of the invention. For example:

1. Other gates beside a diaphragm can be used. A flapper valve can be used. A ball-type valve can be used.
2. Mechanical electrical contacts were discussed above. However, these contacts provide one example of the more generic concept of proximity detection. FIG. 11 shows a PROXIMITY SENSOR, used to detect position of the diaphragm.

The PROXIMITY SENSOR can take the form of a Hall Effect probe, an optical sensor, an inductive sensor, or other type. The invention is not restricted to the particular type of proximity detection discussed.

3. A vacuum system was discussed above. However, the invention is also applicable to check valves used in positive-pressure systems.

What is desired to be secured by Letters Patent is the invention as defined in the following claims.

We claim:

1. A check valve, comprising:
 a) a diaphragm, which mates with a seal, when pressure differential across the diaphragm exceeds a threshold;

b) leaf springs
   i) for supporting the diaphragm;
   ii) for providing a spring force which said pressure differential must overcome; and
   iii) which, together with the diaphragm, define one or more channels for fluid flow, when said pressure differential falls below said threshold.
c) a first electrical contact, supported by the diaphragm; and
d) a second electrical contact, occupying a stationary position, to which the first electrical contact connects, when the diaphragm moves to a predetermined position.

2. Check valve according to claim 1, and further comprising
   e) means for adjusting the stationary position of the second electrical contact.

3. Check valve according to claim 1, and further comprising means for adjusting tension of said leaf springs.

4. In the operation of a vacuum boost system in a vehicle, wherein a vacuum pump draws vacuum in an accumulator, and a check valve maintains the vacuum, the improvement comprising:
   a) detecting opening of the check valve;
   b) running the pump for a predetermined time after the opening;
   c) waiting for a time delay after step 1b); and then
   d) examining whether the check valve has closed, and
      i) if so, terminating running of the pump,.
      ii) if not, repeating step (b).

* * * * *

UNITED STATES PATENT AND TRADEMARK OFFICE
CERTIFICATE OF CORRECTION

PATENT NO. : 5,685,697
DATED : November 11, 1997
INVENTOR(S) : Buchanan et al.

It is certified that error appears in the above-identified patent and that said Letters Patent is hereby corrected as shown below:

Column 1, line 7, after "senses", please insert --a--.

Column 1, line 11, after "called", please insert --a--.

Column 1, line 21, after "draws", please insert --a--.

Column 8, line 4, claim 4, after "draws", please insert --a--.

Column 8, line 8, claim 4, after "running the", please insert --vacuum--.

Column 8, line 10, claim 4, please delete "1b) and insert --4b)-- therefor.

Column 8, line 12, claim 4, after "the", please insert --vacuum--.

Signed and Sealed this

Ninth Day of March, 1999

Attest:

Attesting Officer

Q. TODD DICKINSON

Acting Commissioner of Patents and Trademarks